United States Patent
Apollonio

[11] Patent Number: 5,601,759
[45] Date of Patent: Feb. 11, 1997

[54] METHOD FOR MOLDING CONTACT LENSES

[75] Inventor: Attilio Apollonio, Livonia, N.Y.

[73] Assignee: Bausch & Lomb Incorporated, Rochester, N.Y.

[21] Appl. No.: 134,131

[22] Filed: Oct. 5, 1993

[51] Int. Cl.⁶ ..................................................... B29D 11/00
[52] U.S. Cl. .............................. 264/2.5; 264/1.8; 425/808
[58] Field of Search ........................... 264/2.2, 2.5, 1.7, 264/1.8; 425/808

[56] References Cited

U.S. PATENT DOCUMENTS

| | | | |
|---|---|---|---|
| 2,394,941 | 2/1946 | Smith | 425/808 |
| 3,806,079 | 4/1974 | Beattie | 425/808 |
| 4,383,672 | 5/1983 | Kreuttner | 425/808 |
| 4,640,489 | 2/1987 | Larsen | 425/808 |
| 4,836,960 | 6/1989 | Spector et al. | 425/808 |
| 5,178,801 | 1/1993 | Shimizu et al. | 264/2.5 |
| 5,200,121 | 4/1993 | Hagmann et al. | 264/1.8 |

FOREIGN PATENT DOCUMENTS

| | | |
|---|---|---|
| 0458734 | 11/1991 | European Pat. Off. . |
| A957349 | 2/1950 | France . |
| 62-216927 | 9/1987 | Japan ..................................... 425/808 |

*Primary Examiner*—Mathieu D. Vargot
*Attorney, Agent, or Firm*—John E. Thomas; Craig E. Larson

[57] ABSTRACT

A method of molding a series of contact lenses having a range of optical powers using a matrix of posterior and anterior molds having varying surface characteristics such that the optical powers vary while maintaining constant fitting characteristics, and using a number of mold types which is less than the total number of contact lenses produced in the series.

12 Claims, 1 Drawing Sheet

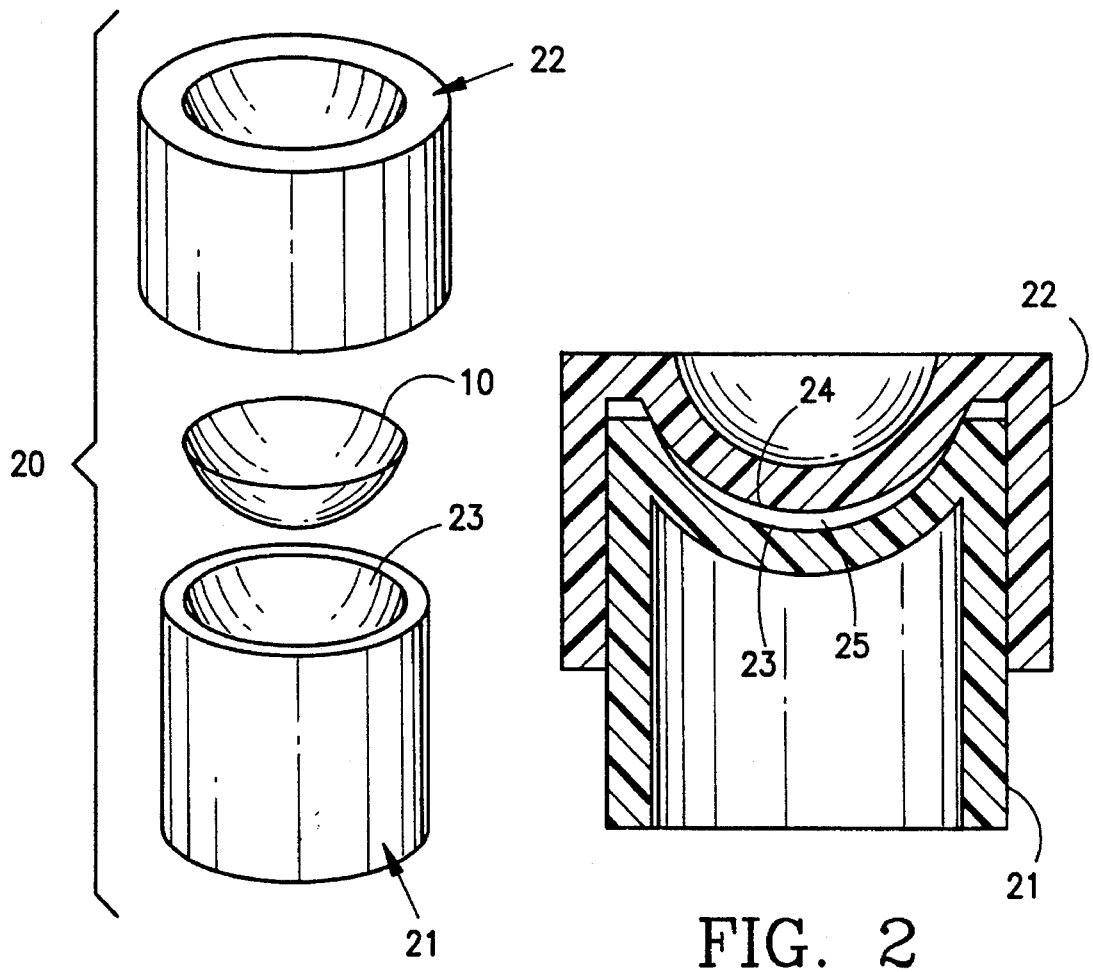
FIG. 1
FIG. 2
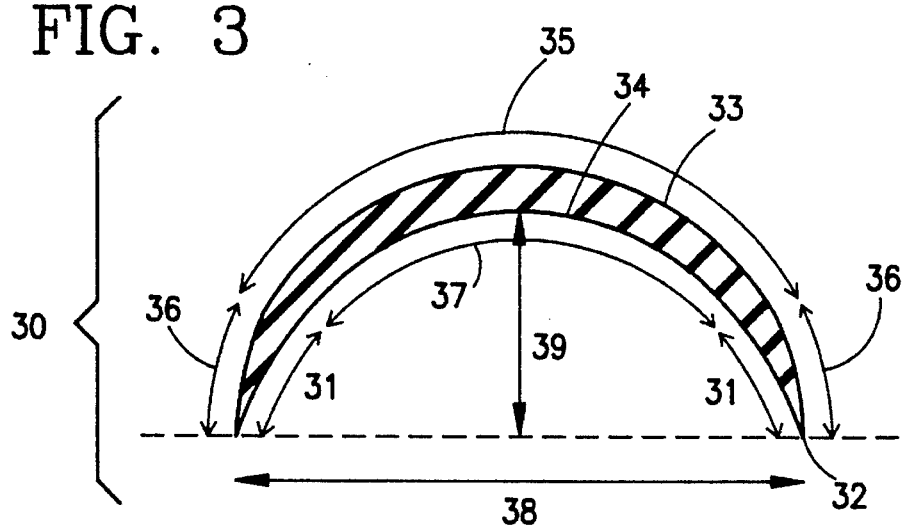
FIG. 3

METHOD FOR MOLDING CONTACT LENSES

FIELD OF THE INVENTION

The present invention relates to a method for molding contact lenses.

BACKGROUND OF THE INVENTION

Contact lenses are cast molded by depositing a curable liquid (a mixture of polymerizable monomers) into a mold cavity formed by two mold halves, curing the liquid, opening the mold cavity, and removing the lens. Other processing steps, for example, hydration in the case of hydrogel lenses, may also be required to produce a finished lens. One mold half forms the anterior lens surface (anterior mold). The other mold half forms the posterior lens surface (posterior mold). The mold halves are typically used only once and then either serve as packaging means or are discarded.

The molds are themselves formed by injection molding. More specifically, tools for the production of molds are formed in accordance with the specification of the corresponding lens surface. The tools are fitted into mold plates in the injection molding machine, and the molds are produced by injection molding a selected resin. Unlike the molds which are used only once, the injection molding tools are used to make thousands of molds. However, the tools must be manufactured to extremely high specifications so that no roughness or surface defects are transferred to the mold being made from the tool. Any such defects on the mold surface would be transferred to, and appear on, the finished lens. The tools are typically made from brass, stainless steel, nickel or some combination thereof.

It is the ultimate desired lens product which determines the design of the mold; more particularly, that portion of the mold which forms a lens surface. The needed mold parameters, in turn, determine the design of the corresponding injection mold tool. According to conventional design procedures, the desired base curve of the lens (a lens parameter related to fitting characteristics) determines the design of the posterior mold. Given the posterior design of the lens (and the corresponding mold and tool), the desired optical characteristics of the lens determines the anterior design of the lens (and the corresponding mold and tool).

Consider, for example, the application of this design approach to hydrogel contact lenses. Hydrogel contact lenses are usually made available in powers of 0.25 diopter increments. Each time a different power lens is to be produced, a corresponding anterior mold type is used. One posterior mold type is used throughout the power range. A contact lens series having powers of, for example, from −0.25 D to −6.00 D in 0.25 D increments has 24 different lens types. Cast molding of the series according to conventional procedures therefore requires 24 differing anterior mold types and one posterior mold type. The number of tools required to produce the series is therefore 25.

Ways have been sought to reduce the number of types of tools required to produce a contact lens series. U.S. Pat. No. 5,200,121 discloses producing only a limited number of tools, but then further modifying the molds produced by the tools to impart the proper power and base curves on finished lenses. A drawback of this method is the need to modify and handle each mold, which is only used once.

SUMMARY OF THE INVENTION

This invention is an improved method of molding contact lenses in mold assemblies having anterior molds with anterior mold cavity defining surfaces and posterior molds with posterior mold cavity defining surfaces to produce a contact lens series having common fitting characteristics and a range of optical powers. The improvement comprises:

providing a set of anterior mold types wherein each anterior mold type has a different anterior mold defining surface and wherein the number of anterior mold types in the set is less than the number of optical powers in the contact lens series;

providing a set of posterior mold types wherein each posterior mold type has a different posterior mold defining surface and wherein the number of posterior mold types in the set is less than the number of optical powers in the contact lens series; and selectively combining anterior mold types with posterior mold types to form a series of mold assemblies corresponding to the contact lens series.

The invention minimizes the number of tool types required to produce the contact lens series, thereby reducing cost.

BRIEF DESCRIPTION OF THE DRAWINGS

FIG. 1 is a perspective exploded view of a mold assembly and a contact lens molded therein.

FIG. 2 is a sectional view of the assembled mold assembly shown in FIG. 1.

FIG. 3 is an enlarged cross-sectional view of the regions of a contact lens.

DETAILED DESCRIPTION OF THE INVENTION

The type of contact lens material used in the process of this invention is not narrowly critical. The method is broadly applicable to any known lens types, including those conventionally referred to as hydrogel lenses and rigid gas permeable lenses. The invention is illustrated below with particular reference to hydrogel lenses.

The method of this invention is for the production of a "contact lens series". Manufacturers typically market contact lens series over a range of optical powers so that "off-the-shelf" lenses may adequately serve the needs of contact lens wearers across a broad prescriptive spectrum. The term "contact lens series" designates lenses having common fitting characteristics over a range of optical powers. What is connoted is a system having the capacity to produce any number of lenses having one array of designs. Each design in the array has common fitting characteristics. The fitting characteristics of the lens are understood to be controlled by lens diameter and the effective base curve. Such fitting characteristics govern how the lens moves on the eye and therefore are important to lens function and overall comfort. Preferably, each design in the array has the same effective base curve. What distinguishes the various designs in the array is the optical correction provided by lenses in the design.

The lenses cast molded by the process of the present invention are cast molded, in one preferred embodiment, between a posterior mold and an anterior mold which, when brought together, form a mold assembly. As shown in FIGS. 1 and 2, each anterior mold (21) has an anterior mold cavity defining surface (23). Each posterior mold (22) has a posterior mold cavity defining surface (24). The curable liquid which is preferably a polymerizable monomer mix is introduced to the anterior mold cavity defining surface (23), the two molds are brought into close association and the mix is compressed to fill the molding cavity (25) and cured into a contact lens (10).

The surface characteristics which are present on the anterior and posterior mold cavity defining surfaces are transferred to the respective anterior and posterior surfaces of the molded contact lens. It is known that an effective lens design must balance the competing needs of the optical power and proper fitting characteristics on the eye. For example, a typical design for a single vision spherical lens must combine 1) overall lens diameter, 2) an anterior power curve for optical correction, 3) an anterior carrier curve, 4) a posterior fitting curve and 5) a posterior edge bevel.

In the illustrative contact lens (30) cross-section, as shown in FIG. 3, the posterior edge bevel (31) is the region optionally found on the posterior peripheral zone of the contact lens (30) and has a single curvature. For a lens having, for example, a 9.00 mm diameter (38), the posterior edge bevel (31), if present, would typically extend up to 2.0 mm from the edge of the lens inwardly toward the lens center. The edge (32) of the lens is understood to be that part of the lens joining the anterior (33) and posterior (34) surfaces. The anterior power curve (35) and the anterior carrier curve (36) combine to form the complete anterior surface. The anterior power curve covers the region known as the anterior optical zone surface.

The fitting curve (37) is imparted onto the posterior surface (34) of the cast molded contact lens from the posterior mold cavity defining surface and extends across the posterior optical zone surface of the lens outwardly to the edge bevel (31). The optical zones, both posterior and anterior may be measured as a function of central mold radii in millimeters as would be understood by those skilled in the field.

The posterior side (34) of the lens will rest against the eye and is designed to have a curvature that conforms to the eye's particular curvature. Typically, a range of fitting curves is made available in an attempt to properly fit a population with varying degrees of eye curvature. The posterior surface of the lens, or effective base curve, is defined by the lens diameter (38) and saggital depth (39) and can be expressed mathematically as follows:

$$R = \frac{S^2 + \left(\frac{D}{2}\right)^2}{2 \times S}$$

wherein

R=effective base curve

S=saggital depth (overall lens height—center thickness)

D=diameter (overall lens diameter—edge thickness).

For a soft lens, the preferred range of useful effective base curves is from about 7.5 to 9.5 mm, with the most preferred range being from about 8.0 to 9.2 mm, in increments of about 0.2 to 0.3 mm. For hard lenses, the preferred range of useful effective base curves is from about 6.5 to 9.0 mm, with the most preferred range being from about 7.2 to about 8.4 mm, in increments of about 0.05 to 0.1 mm.

As already explained, it is often desirable to maintain a particular fitting curve while altering the optical powers available over a series of contact lenses. For example, lenses are often available in a range of optical powers varying by 0.25 diopters for each desired effective base curve. A diopter is a unit of power that is understood to be the inverse of the focal length of the lens measured in meters. The optical zone of a lens is defined as the portion of the lens which renders a prescribed optical effect. Such prescribed optical effect results from the cooperation of the anterior and posterior surface curves in the anterior and posterior optical zones according to known optical principles as will be readily apparent to those skilled in the field.

The following Table 1 illustrates the present invention by showing how seven posterior mold types having varying mold cavity defining surfaces (measured in terms of central mold radii) can be combined with four anterior mold types having varying mold cavity defining surfaces (measured in terms of central mold radii) to achieve a contact lens series of 28 varying optical powers measured in diopters. The posterior mold types differ incrementally, one from the other, by a lens power equal to 1.00 diopter. The anterior mold types differ incrementally, one from the other, by a lens power equal to 0.25 diopter.

TABLE 1

| Posterior Mold Series | Anterior Mold Series | | | |
|---|---|---|---|---|
| | A1 (7.648) | A2 (7.686) | A3 (7.723) | A4 (7.763) |
| P1 (7.604) | 0.00 | −0.25 | −0.50 | −0.75 |
| P2 (7.461) | −1.00 | −1.25 | −1.50 | −1.75 |
| P3 (7.320) | −2.00 | −2.25 | −2.50 | −2.75 |
| P4 (7.183) | −3.00 | −3.25 | −3.50 | −3.75 |
| P5 (7.053) | −4.00 | −4.25 | −4.50 | −4.75 |
| P6 (6.926) | −5.00 | −5.25 | −5.50 | −5.75 |
| P7 (6.803) | −6.00 | −6.25 | −6.50 | −6.75 |

Central Mold Radius in (mm)

As shown in Table 1, to produce a series of 28 lenses varying by 0.25 diopters, a total of eleven (11) different mold types (seven posterior molds each varying by 1.00 diopter and four anterior molds each varying by 0.25 diopters) are required according to the present invention. It is understood that it may be desirable to have the anterior mold types vary by a greater or lesser amount while the posterior mold types may vary by a greater or lesser amount.

According to known methods, to produce a series of 28 cast molded lenses, each with varying lens power, it would require the use of twenty-nine (29) different mold types. Since it is difficult to fit the eye comfortably, the base curve of the lens, which is formed from the posterior mold, is seldom varied to impart lens power. Therefore, it would be customary to have one posterior mold type and twenty-eight (28) different anterior mold types. Each anterior mold type would then vary by 0.25 diopters to produce the above-described range or series of 28 different lens powers.

Again referring to Table 1, since only 11 different mold types are required, only 11 different tool types are needed to make the molds. This is in sharp contrast to the need for 29 tool types to make the molds conventionally required for a contact lens series having 28 differing optical powers. The machining cost of each metal tool type may be between about $700 and $1000 per tool. Therefore, a significant start-up cost is avoided by the process of the present invention. Such cost savings would obviously continue over the course of the project since fewer different types of tools would need to be replaced.

It is realized that the process of the present invention can be expressed such that the total possible number of lenses produced in said contact lens series exceeds the combined number, or sum of available posterior and anterior mold types used to make said contact lens series. For example, in Table 1, the number of lenses produced in the series is 28, while only 11 different lens mold types are required to make the 28 different lenses. By contrast, according to known methods, the number of lenses able to be produced in such a contact lens series having 28 lenses with different optical powers is exceeded by the number of different lens mold types required (29, i.e. 28 anterior mold types and 1 posterior mold type).

It is preferable that there is one unique combination of anterior mold type and posterior mold type to be combined as one mold assembly for each particular optical power over the optical power range for a particular contact lens series. It is further understood that the present invention allows for the incremental increase or decrease in optical power over the contact lens series produced, by combining the proper anterior mold type selected from the set of anterior molds with the proper posterior mold type selected from the set of posterior molds. In this way, a contact lens series may be produced having contact lenses with varying optical powers over a range of preselected optical powers in any desired incremental diopter value.

It is also understood that the present invention can be adapted as would be apparent to one skilled in the field to make toric, bifocal, multifocal or other lens series or other specialty lens series which may have complex curve orientations.

Many other modifications and variations of the present invention are possible to the skilled practitioner in the field in light of the teachings herein. It is therefore understood that, within the scope of the claims, the present invention can be practiced other than as herein specifically described.

I claim:

1. In a method of molding contact lenses in mold assemblies having anterior molds with anterior mold cavity defining surfaces and posterior molds with posterior mold cavity defining surfaces to produce a contact lens series having a range of optical powers and common fitting characteristics including a common effective base curve, the improvement comprising:

providing a set of anterior mold types wherein each anterior mold type has a different anterior mold defining surface and wherein the number of anterior mold types in the set is less than the number of optical powers in the contact lens series;

providing a set of posterior mold types wherein each posterior mold type has a different posterior mold defining surface and wherein the number of posterior mold types in the set is less than the number of optical powers in the contact lens series; and selectively combining anterior mold types with posterior mold types to form a series of mold assemblies corresponding to the contact lens series having the range of optical powers and common fitting characteristics including a common effective base curve.

2. The method of claim 1 wherein the contact lenses are single vision lenses.

3. The method of claim 1 wherein the contact lenses are multifocal lenses.

4. The method of claim 1 wherein the contact lenses are toric lenses.

5. The method of claim 1 wherein the contact lenses are hydrogel lenses.

6. The method of claim 1 wherein the contact lenses are rigid gas permeable lenses.

7. The method of claim 1 wherein the optical powers of the contact lens series vary incrementally throughout the range.

8. The method of claim 1 wherein the anterior mold types in the set of anterior molds have different anterior optical zone surfaces and the posterior mold types in the set of posterior molds have different posterior optical zone surfaces.

9. The method of claim 8 wherein the contact lenses are single vision lenses.

10. The method of claim 8 wherein the anterior optical zone surfaces vary in quarter-diopter increments and the posterior optical zone surfaces vary in diopter increments.

11. The method of claim 8 wherein the posterior optical zone surfaces vary in quarter-diopter increments and the anterior optical zone surfaces vary in diopter increments.

12. The method of claim 1 wherein the number of optical powers in the contact lens series exceeds the sum of the number of anterior and posterior mold types.

* * * * *